(12) United States Patent
Song et al.

(10) Patent No.: US 9,348,448 B2
(45) Date of Patent: May 24, 2016

(54) LIQUID CRYSTAL DISPLAY INTEGRATED TOUCH SCREEN PANEL

(75) Inventors: Sung-Hoon Song, Yongin (KR); Sang-Hyun Jun, Yongin (KR)

(73) Assignee: SAMSUNG DISPLAY CO., LTD., Yongin, Gyeonggi-do (KR)

(*) Notice: Subject to any disclaimer, the term of this patent is extended or adjusted under 35 U.S.C. 154(b) by 577 days.

(21) Appl. No.: 13/137,962

(22) Filed: Sep. 22, 2011

(65) Prior Publication Data

US 2012/0113027 A1 May 10, 2012

(30) Foreign Application Priority Data

Nov. 8, 2010 (KR) .................. 10-2010-0110270

(51) Int. Cl.
*G06F 3/041* (2006.01)
*G09G 3/36* (2006.01)

(52) U.S. Cl.
CPC ............ *G06F 3/0412* (2013.01); *G09G 3/3648* (2013.01); *G09G 2300/0426* (2013.01)

(58) Field of Classification Search
USPC ......................................................... 345/173
See application file for complete search history.

(56) References Cited

U.S. PATENT DOCUMENTS

| | | | |
|---|---|---|---|
| 6,456,279 B1* | 9/2002 | Kubo et al. ................... | 345/173 |
| 7,663,607 B2 | 2/2010 | Hotelling et al. | |
| 2006/0097991 A1 | 5/2006 | Hotelling et al. | |
| 2010/0182273 A1 | 7/2010 | Noguchi et al. | |
| 2010/0194704 A1* | 8/2010 | Koito et al. ................... | 345/173 |
| 2010/0214260 A1* | 8/2010 | Tanaka et al. ................ | 345/174 |
| 2010/0328248 A1* | 12/2010 | Mozdzyn ...................... | 345/174 |
| 2011/0187677 A1* | 8/2011 | Hotelling et al. ............. | 345/174 |

FOREIGN PATENT DOCUMENTS

| | | |
|---|---|---|
| JP | 09-292622 | 11/1997 |
| JP | 2009-244958 A | 10/2009 |
| JP | 2009-276403 | 11/2009 |
| KR | 10-2004-0001324 A | 1/2004 |
| KR | 10-2009-0019902 A | 2/2009 |
| KR | 10-0954898 B1 | 4/2010 |
| WO | WO-2009/119664 A1 | 10/2009 |

* cited by examiner

*Primary Examiner* — Claire X Pappas
*Assistant Examiner* — Sepideh Ghafari
(74) *Attorney, Agent, or Firm* — Lee & Morse, P.C.

(57) ABSTRACT

A display device includes a liquid crystal display with an integrated touch screen panel including a first substrate having a plurality of gate wires and a plurality of data wires and having a plurality of pixels. Each pixel includes a thin film transistor and a pixel electrode. The display device also includes a second substrate opposite to the first substrate, an insulating layer on the pixel electrode, a plurality of transparent electrodes arranged in a first direction on the insulating layer, a plurality of metal electrodes forming coupling parts attached to predetermined sides of the transparent electrodes and forming driving wires that receive driving signals, a plurality of sensing electrodes arranged on the second substrate in a second direction that intersects the first direction, and a liquid crystal layer between the first substrate and the second substrate.

18 Claims, 8 Drawing Sheets

LIQUID CRYSTAL DISPLAY INTEGRATED TOUCH SCREEN PANEL

CROSS-REFERENCE TO RELATED APPLICATION

This application claims priority to and the benefit of Korean Patent Application No. 10-2010-0110270, filed on Nov. 8, 2010, in the Korean Intellectual Property Office, the entire content of which is incorporated herein by reference.

BACKGROUND

As the interest in information displays increases and requirements for using portably information devices increase, a research about flat panel displays replacing the existing cathode ray tubes has been increasingly conducted and more products have been commercialized. For example, a liquid crystal display, which is a type of flat panel display devices, has been developed. The liquid crystal display may display an image using, e.g., optical anisotropy of a liquid crystal, and may have high resolution, color display, and image quality. The liquid crystal display may be used, e.g., for notebooks and desktop monitors. The liquid crystal display may also have a touch screen function that allows a user's commands to be inputted by selection on the screen.

SUMMARY

Embodiments may be realized by providing a liquid crystal display with an integrated touch screen panel, which includes a first substrate equipped with a plurality of gate wires and a plurality of data wires and having a plurality of pixels each including a thin film transistor and a pixel electrode; a second substrate opposite to the first substrate; an insulating layer on the pixel electrode; a plurality of transparent electrodes arranged in a first direction on the insulating layer; a plurality of metal electrodes forming coupling parts attached to predetermined sides of the transparent electrodes and driving wires receiving driving signals; a plurality of sensing electrodes arranged in a second direction interesting the first direction, on the second substrate; and a liquid crystal layer between the first substrate and the second substrate.

Further, the coupling part may have an opening.

Further, the transparent electrodes may have a plurality of slits.

Further, the transparent electrodes may be made of ITO (Indium Tin Oxide).

Further, the thin film transistor may have a first electrode connected with the data wire, a gate electrode connected with the gate wire, and a second electrode connected to the pixel electrode.

Further, the liquid crystal display integrated touch screen panel may further include a driving electrode driving unit that sequentially supplies driving signals to driving wires of the metal electrodes.

Further, the liquid crystal display integrated touch screen panel may further includes a first polarizer and a second polarizer that are attached to the outer sides of the first substrate and the second substrate, respectively, and a window attached to the outer side of the second polarizer.

Further, the sensing electrodes may be formed between the second substrate and the window.

The liquid crystal display integrated touch screen panel may further includes a black matrix under the first substrate and color filter patterns.

Further, the liquid crystal display integrated touch screen panel may further include a backlight providing light, under the first substrate.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2010-0110270, filed on Nov. 8, 2010, in the Korean Intellectual Property Office, and entitled: "Liquid Crystal Display integrated Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Connection of a part with another part includes direct connection and electric connection of the parts with another device therebetween. Further, the parts not related to the present invention are removed in order to make the description of the present invention clear, and like components are given like reference numerals throughout the specification. In the figures, the dimensions of layers and regions may be exaggerated for clarity of illustration.

Hereinafter, exemplary embodiments are described with reference to the accompanying drawings.

Figure 1:
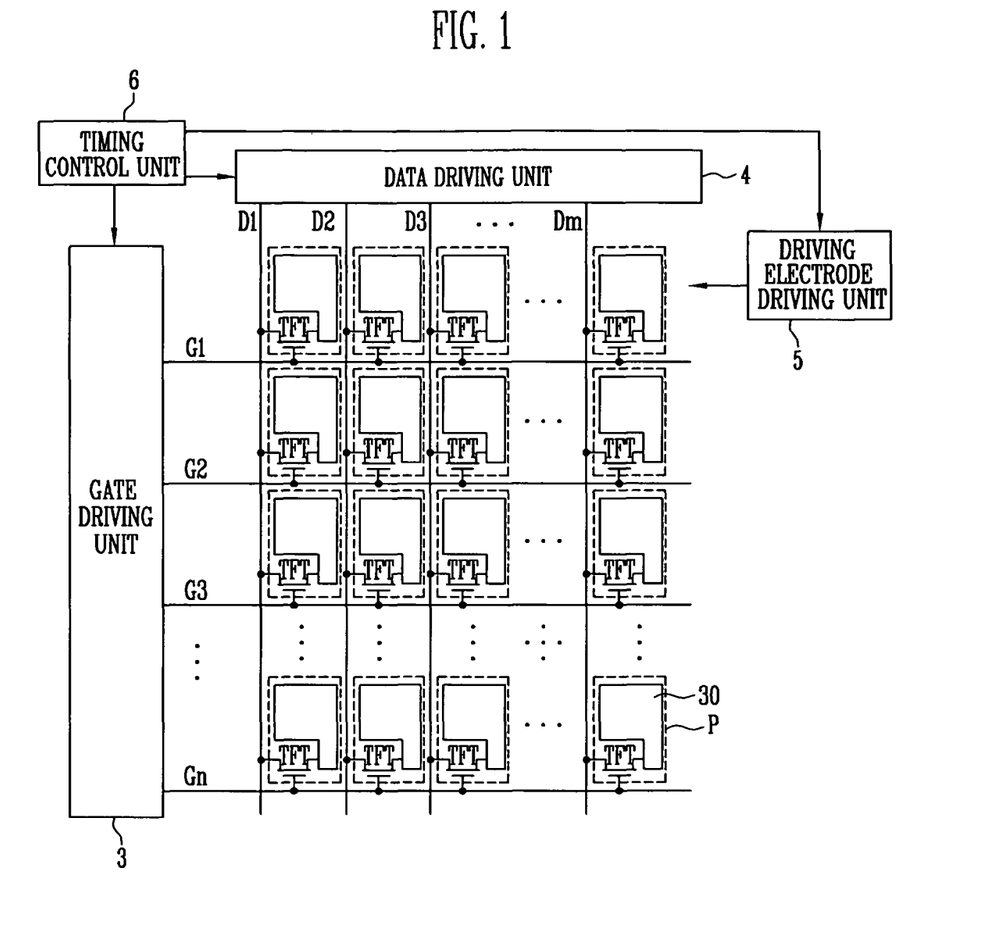
FIG. 1 illustrates a block diagram of a liquid crystal display integrated touch screen panel, according to an exemplary embodiment.
Figure 2:
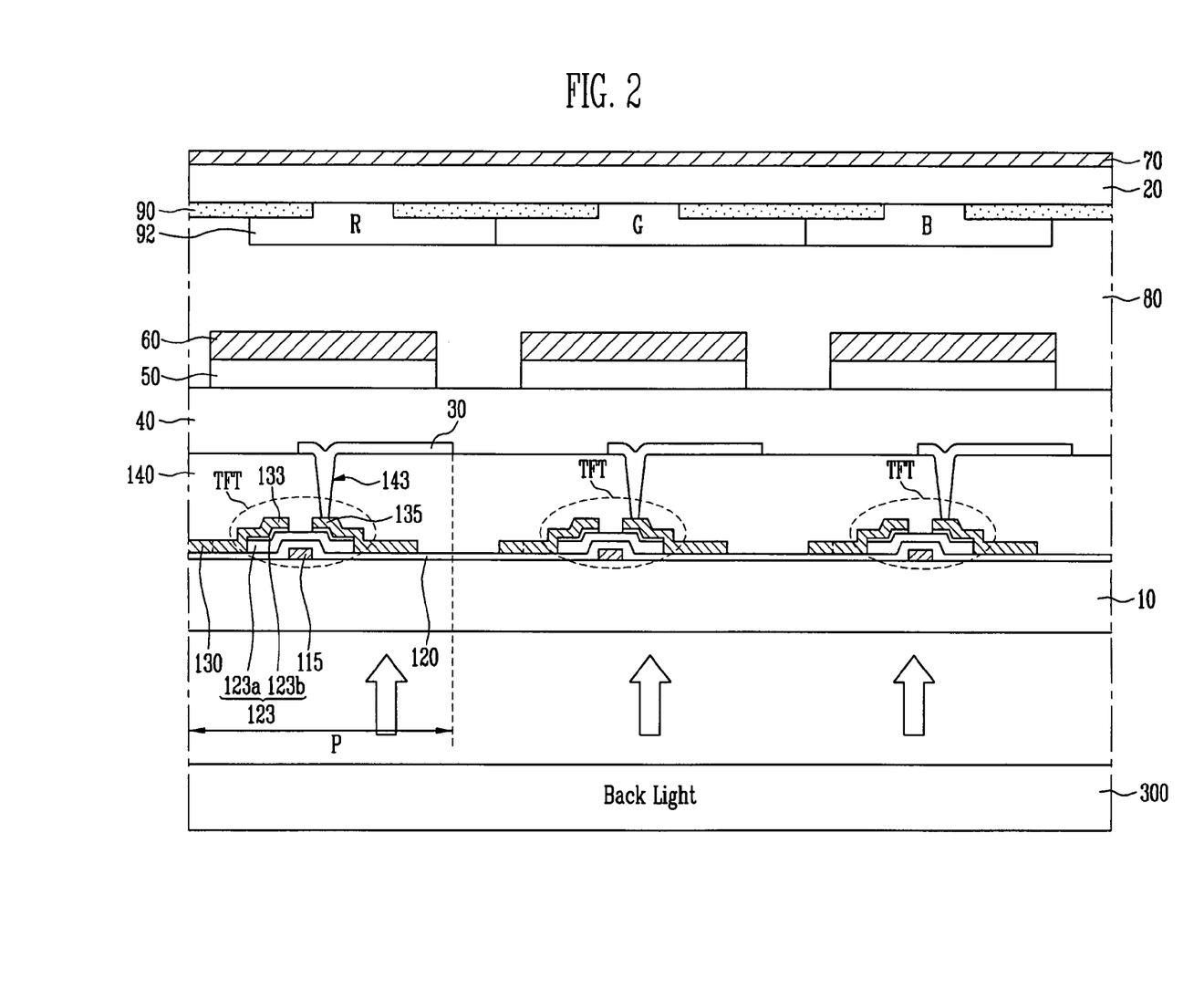
FIG. 2 illustrates a cross-sectional view of an area of a liquid crystal display integrated touch screen panel, according to an exemplary embodiment.

FIG. 1 illustrates a block diagram showing a display having a liquid crystal display with an integrated touch screen panel according to an exemplary embodiment, and FIG. 2 illustrates a cross-sectional view showing an area of the display including the liquid crystal display with an integrated touch screen panel according to a first exemplary embodiment. In particular, FIG. 2 illustrates a cross-sectional view taken along the axis A-B in FIG. 4.

A liquid crystal display with an integrated touch screen panel, according to an exemplary embodiment, may include a first substrate 10 and a second substrate 20. Between the first and second substrates 10 and 20 may be an insulating layer 40, a plurality of transparent electrodes 50, a plurality of metal electrodes 60, a plurality of sensing electrodes 70, and a liquid crystal layer 80.

The first substrate 10 may be an array substrate, on which gate wires G1 to Gn and data wires D1 to Dm may be arranged to intersect each other. A plurality of pixels P, e.g., each including a thin film transistor TFT and a pixel electrode 30, may be disposed on the first substrate 10.

A backlight 300 providing light to display an image may be disposed under the first substrate 10

Referring to FIG. 1, the first substrate 10 may have a display area with the pixels P and a non-display area with various driving units and wires. A gate driving unit 3 may supply gate signals to the gate wires G1 to Gn. A data driving unit 4 may supply data signals to the data wires D1 to Dm. A driving electrode driving unit 5 may supply driving signals to the transparent electrodes 50 and metal electrodes 60. A timing control unit 6 may control the gate driving unit 3, the data driving unit 4, and the driving electrode driving unit 5 in the non-display area.

The thin film transistors TFT may be at the intersections of the gate wires G1 to Gn and the data wires D1 to Dm, respectively, in connection with the pixel electrodes 30 in the pixels P.

Referring to FIG. 2, the thin film transistor TFT may include a gate electrode 115 connected with a gate line, a first electrode 133 (e.g. a source electrode), a second electrode 135 (e.g. a drain electrode), and a semiconductor layer 123 between the gate electrode 115 and the first and second electrodes 133 and 135. The semiconductor layer 123 may include an active layer 123a and an ohmic contact layer 123b.

A gate insulating layer 120 may be on the gate electrode 115, a passivation layer 140 may be on and in between the first and second electrodes 133 and 135. The passivation layer 140 may have a contact hole 143 exposing the second electrode 135.

The pixel electrode 30 may be on the passivation layer 140 and may be connected with the second electrode 135 through the contact hole 143.

The image display operation of the liquid crystal display with an integrated touch screen panel having the structure described above is simply described below.

First, when a gate signal is transmitted to the gate electrode 115 of the thin film transistor TFT in the pixel P, the active layer 123a may be activated and the first electrode 133 may transmit the data signal transmitted from the data wire 130 connected with the first electrode 133 to the second electrode 135 at a predetermined distance through the active layer 123a thereunder.

Since the second electrode 135 may be electrically connected with the pixel electrode 30 through the contact hole 143, the voltage of the data signal may be applied to the pixel electrode 30. Therefore, the liquid crystal molecules in the liquid crystal layer 80 may be rearranged by the voltage corresponding to a difference between the voltage applied to the pixel electrode 30 and the voltage applied to the metal electrode 60, such that a predetermined image is displayed.

The insulating layer 40 may be on the pixel electrode 30. The transparent electrodes 50 and the metal electrodes 60 may be on the insulating layer 40. For example, referring to FIG. 2, when the transparent electrodes 50 may be patterned first on, e.g., directly on, the insulating layer 40 and the metal electrodes 60 may be formed on the transparent electrodes 50.

Figure 3:
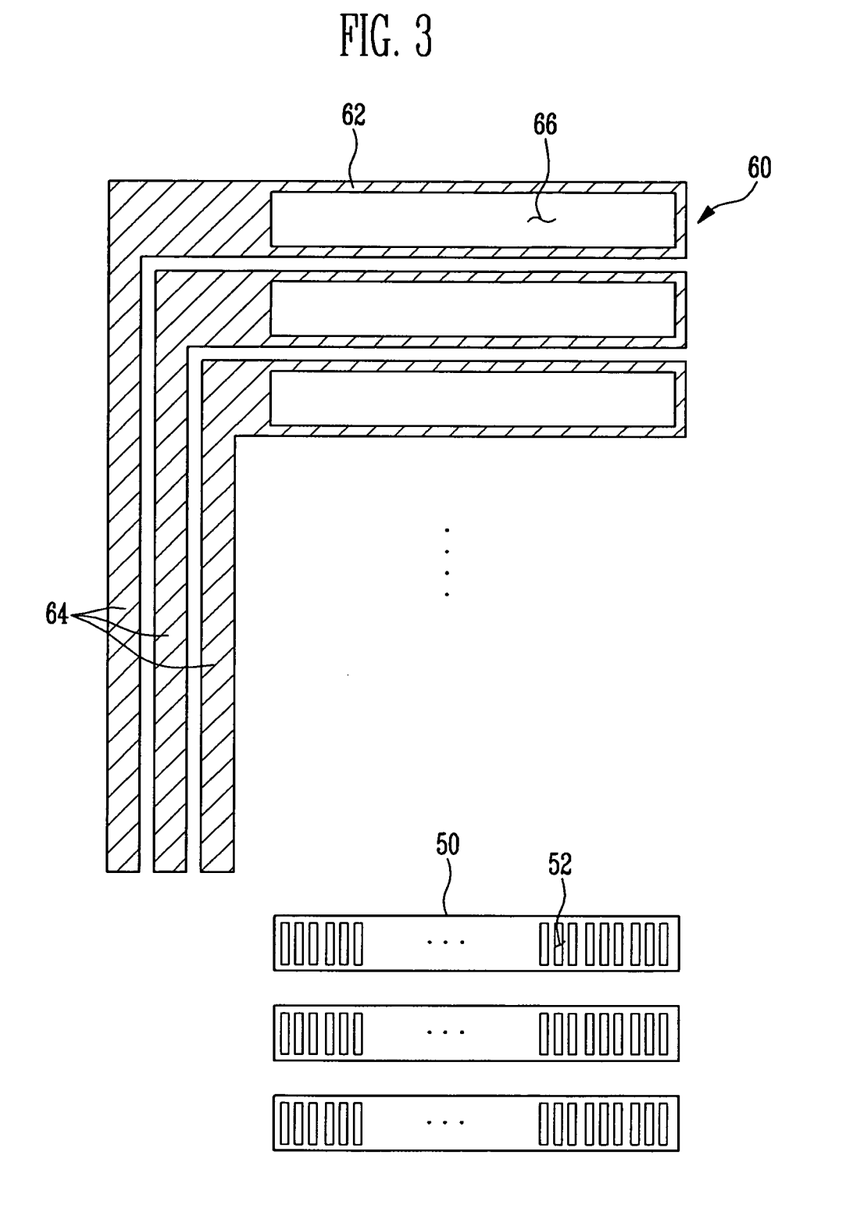
FIG. 3 illustrates a view of a metal electrode and a transparent electrode, which are separated.
Figure 4:
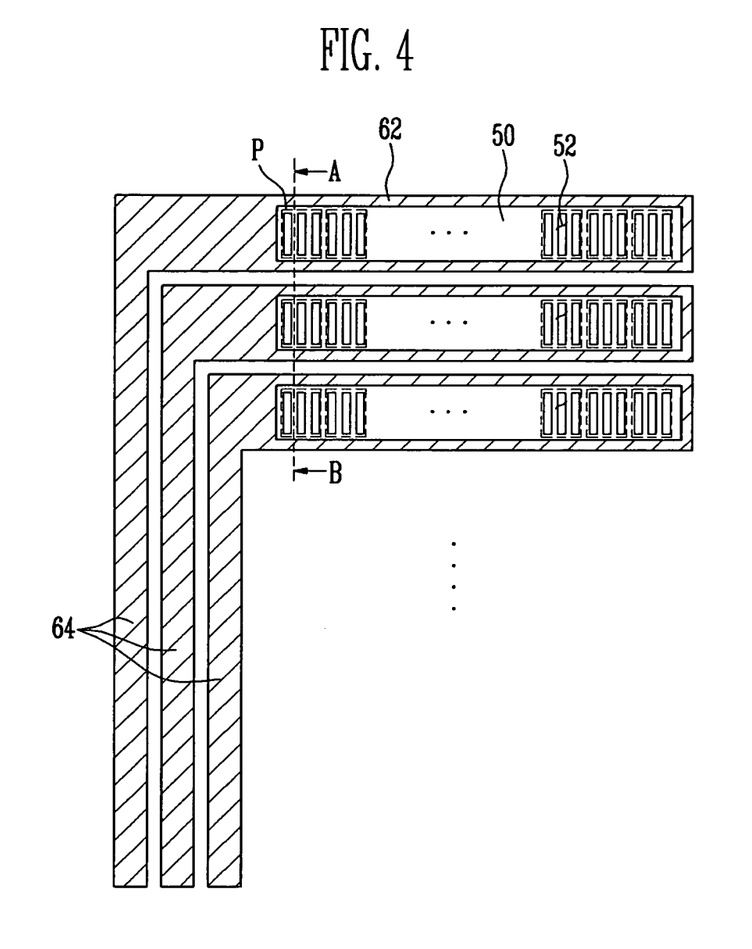
FIG. 4 illustrates a view of an assembly of the transparent electrode and the driving electrode shown in FIG. 2.

FIG. 3 illustrates a schematic view showing separated metal electrodes 60 and transparent electrodes 50. FIG. 4 illustrates a view showing an assembly of the transparent electrodes 50 and the metal electrodes 60 according to the exemplary embodiment shown in FIG. 2.

The transparent electrodes 50 may be arranged in a first direction on the insulating layer 40. The transparent electrodes 50 are made of a transparent conductive material, and the transparent electrodes 50 may be made of ITO (Indium Tin Oxide). The transparent electrodes 50 may be arranged to correspond to respective pixels P in the display area.

The transparent electrodes 50 may each have a plurality of slits 52 to, e.g., generate a fringe electric field with the pixel electrode 30 in corresponding pixel P, as shown in FIG. 4. Although FIG. 4 shows when each pixel 3 corresponds to three slits 52, this is just an embodiment and may be modified in various ways.

The metal electrodes 60 may be composed of a coupling part 62 at one side of the transparent electrode 50 and a driving wire 64 receiving a driving signal from the driving unit 5.

The coupling unit 62 may have an opening therein to transmit light from the backlight unit 300. The coupling unit 62 may be attached to the transparent electrode 50, such the coupling unit 62 may be in the display area with the pixel P and the driving wire 64 may be in the non-display area.

Referring to FIG. 4, when the metal electrode 60 is attached to the top of the transparent electrode 50, the edge of the transparent electrode 50 may be attached to the bottom of the coupling part 62 of the metal electrode 60 and the slits 52 may be exposed upward through the opening 66 in the metal electrode 60.

Figure 5:
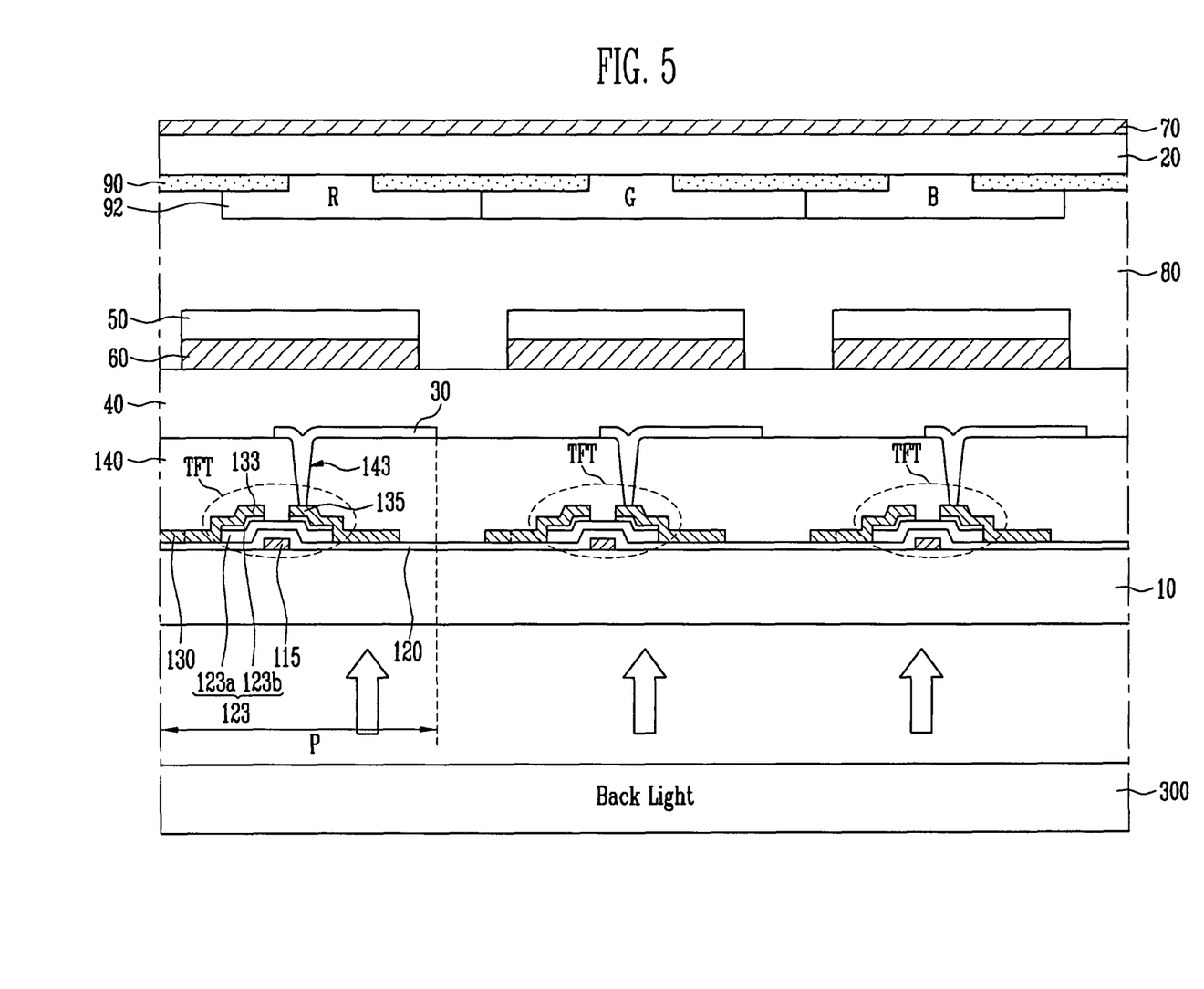
FIG. 5 illustrates a cross-sectional view of an area of a liquid crystal display integrated touch screen panel, according to an exemplary embodiment.
Figure 6:
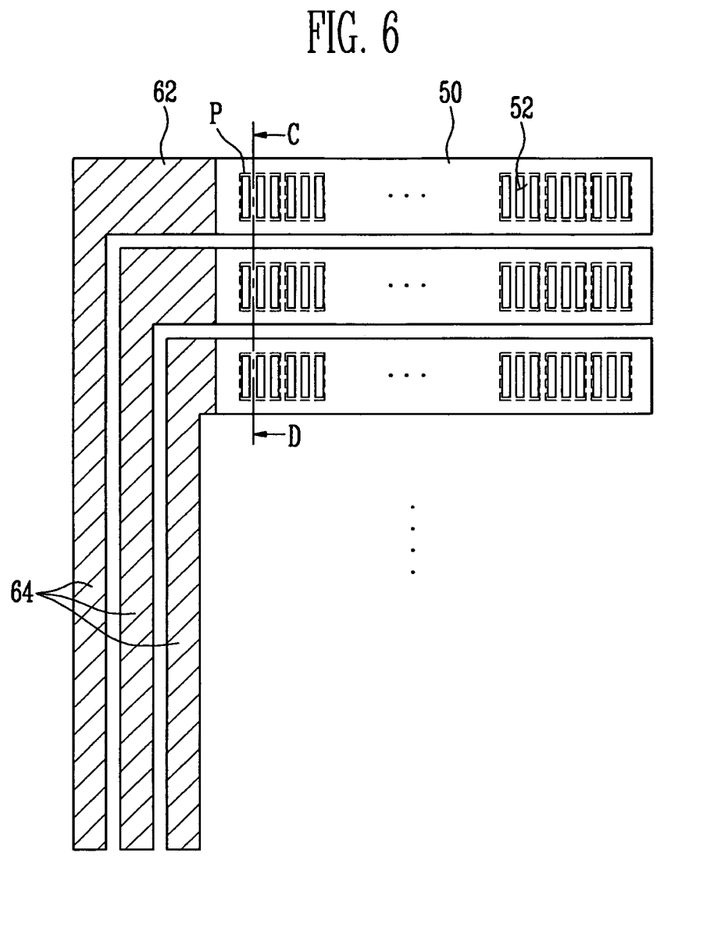
FIG. 6 illustrates a view of an assembly of the transparent electrode and the driving electrode shown in FIG. 5.

FIG. 5 illustrates a cross-sectional view showing an area of a liquid crystal display integrated touch screen panel according to a second exemplary embodiment. FIG. 6 illustrates a view showing an assembly of the transparent electrode and the driving electrode according to the second embodiment shown in FIG. 5. In particular, FIG. 5 illustrates a cross-sectional view taken along the axis C-D in FIG. 6.

Referring to FIG. 5, the metal electrodes 60 may be patterned first on the insulating layer 40 and transparent electrodes 50 may be formed on the transparent electrodes 60. The other configurations are the same as those in the first embodiment.

Referring to FIG. 6, the edge of the transparent electrode 50 may be attached to the top of the coupling part 62 of the metal electrode 60.

The second substrate 20 may be a color filter substrate, opposite to the first substrate 10. The liquid crystal layer 80 may be in between the first substrate 10 and the second substrate 20.

A black matrix 90 may have a lattice shape surrounding the pixels P to cover the non-display area, such as the gate wires G1 to Gn, the data wires D1 to Dm, and the thin film transistors TFT. Color filter patterns 92 of red R, green G, and blue B may be sequentially and repeatedly arranged to correspond to the pixels P in the black matrix 90 on the bottom of the second substrate 20.

The first substrate 10 and the second substrate 20 may be transparent substrates and may be made of insulating material, such as glass, plastic, silicon, or synthetic resin.

A plurality of sensing electrodes 70 may be arranged at a predetermined distance from each other in the second direction interesting the first direction, on the top of the second substrate 20. The sensing electrodes 70 may be made of a transparent conductive material, e.g. ITO.

As a result, since the driving wire 64 receiving a driving signal may be made of metal, the resistance may be reduced. In particular, it is possible to minimize the resistance by integrally making the driving wire 64 and the coupling part 62 of metal and attaching the coupling part 62 to the transparent electrode 50.

Further, since the driving wires 64 may be made of metal, a portion of the black matrix 90 on the driving wires 64 may be removed.

Further, since the insulating layer 40 may be under the metal electrode 60, it is possible to minimize interference with the wires, such as the gate wires.

Figure 7:
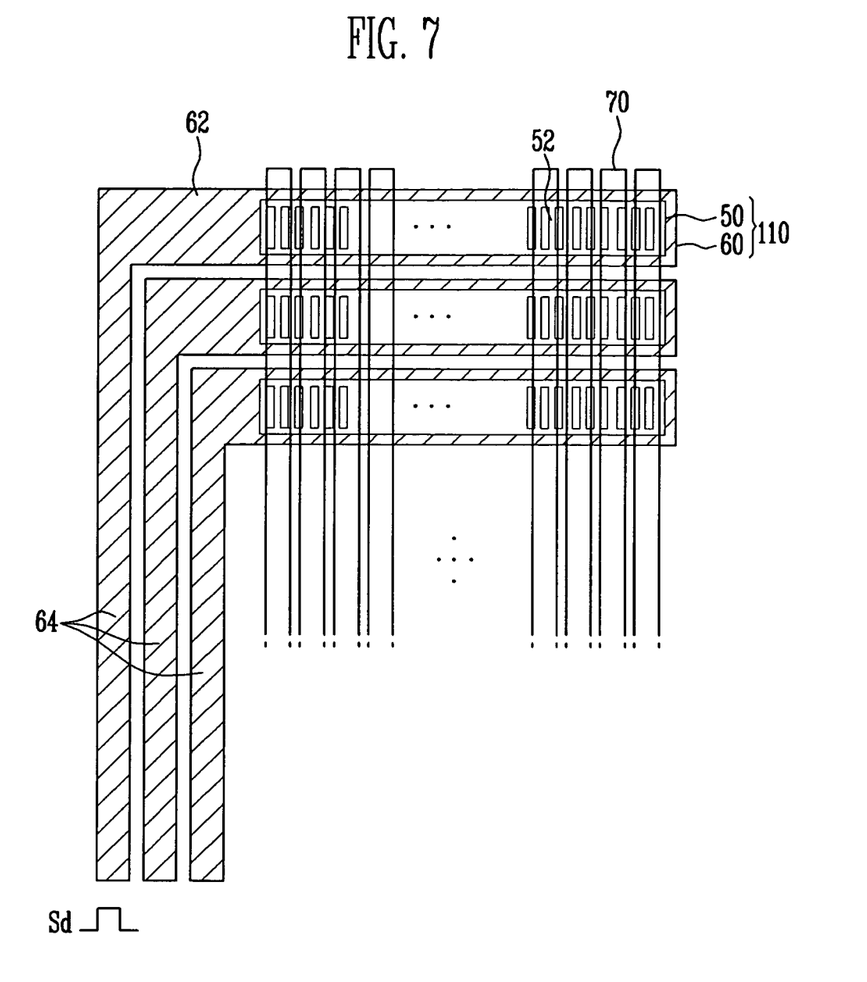
FIG. 7 illustrates a view of an arrangement of a sensing electrode, a transparent electrode, and a metal electrode.

FIG. 7 illustrates a view showing an exemplary arrangement of a sensing electrode, a transparent electrode, and a metal electrode.

Referring to FIG. 7, the coupled transparent electrodes 50 and the metal electrodes 60 may be arranged in the first direction, e.g., in a horizontal direction, and the sensing electrodes 70 may be arranged in the second direction, e.g., in a vertical direction, intersecting the first direction. The coupled transparent electrodes 50 and the metal electrodes 60 may become driving electrodes 110 that receive driving signals Sd in, e.g., a mutual capacitive touch screen panel. In more detail, the driving electrode 110 may be composed of the coupling part 62 of a metal electrode 60 and a transparent electrode 50.

Mutual capacitance may be generated between the driving electrodes 110 and the sensing electrodes 70, e.g., at the intersections made by the arrangement of the driving electrodes 110 and the sensing electrode 70. The intersections where the mutual capacitance is generated may function as sensing cells that sense a touch.

The mutual capacitance generated by the sensing cells may generate coupled-sensing signals to the sensing electrodes 70 connected to the sensing cells, when driving signals Sd are supplied to the driving electrodes 110 connected to the sensing cells. Therefore, when touch occurs, e.g., a person's finger, etc, contacts with the liquid crystal display, the mutual capacitance changes. Accordingly, the sensing signal changes, thereby recognizing the touch.

The driving electrode driving unit 5 may sequentially supply driving signals Sd to the driving wires 64 connected with itself to determine the coordinates of the position touched by the person. The driving signals Sd may be transmitted to the driving electrodes 110 through the driving wires 64.

As described above, it is possible to acquire the Y-axis coordinate of the touch point by sequentially supplying the driving signals Sd to the driving wires 64 and it is possible to acquire the X-axis coordinate of the touch point by detecting sensing signals from the sensing electrodes 70.

Figure 8:
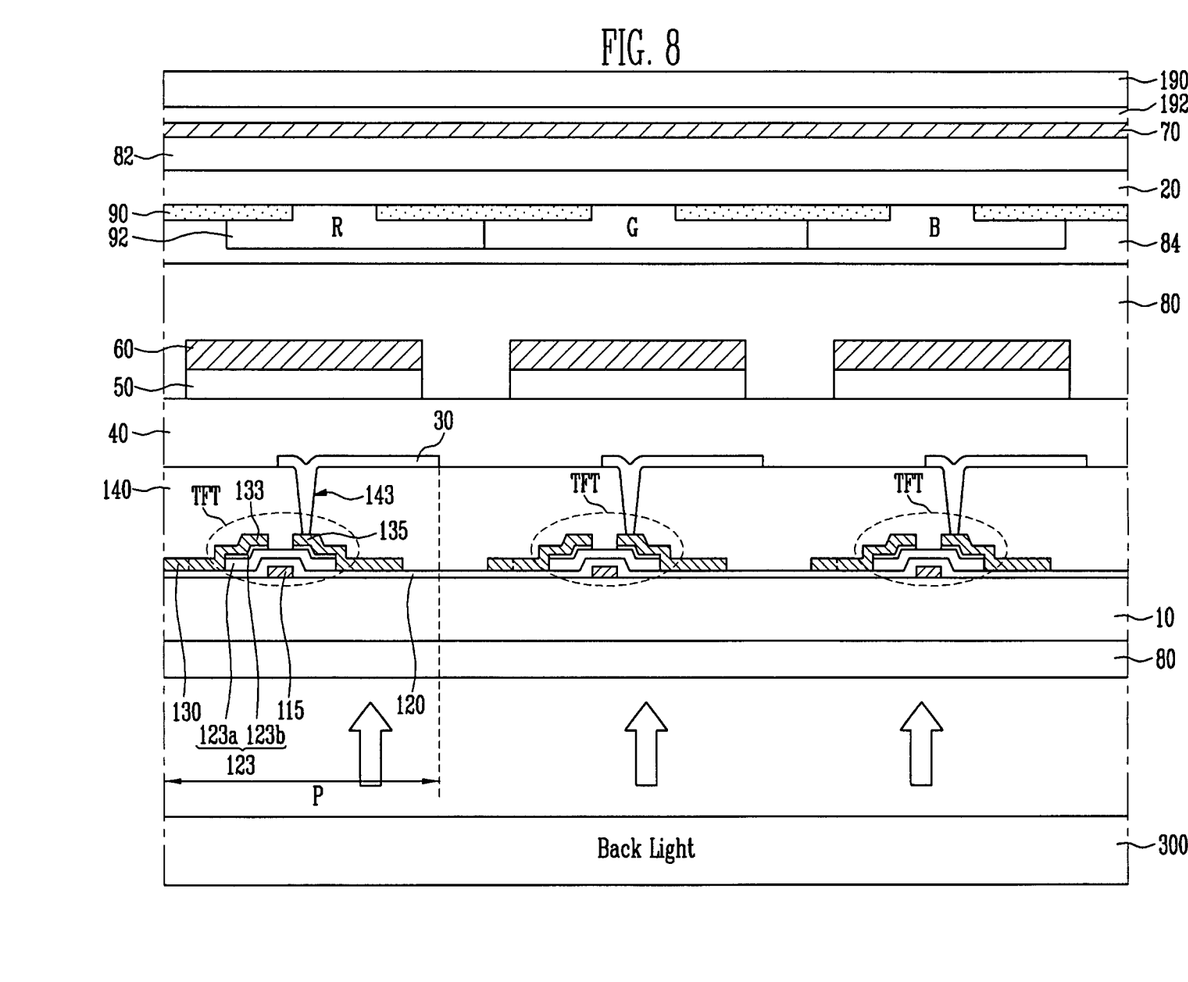
FIG. 8 illustrates a cross-sectional view of an area of a liquid crystal display with an integrated touch screen panel, according to an exemplary embodiment.

FIG. 8 illustrates a cross-sectional view showing an area of a liquid crystal display integrated touch screen panel according to a third exemplary embodiment.

Referring to FIG. 8, in a liquid crystal display integrated touch screen panel according to the third exemplary embodiment, first and second polarizers 80 and 82 may be attached to the outer sides of first and second substrates 10 and 20, respectively. A window 190 as a transparent substrate may be attached to the polarizer adjacent to the side where an image is displayed.

According to the third embodiment shown in FIG. 8, a backlight 300 may be under the first substrate 10, such that an image may be displayed toward the second substrate 20 and the window 190 may be attached to the second polarizer 82 by an adhesive layer 192. In the embodiment shown in FIG. 8, since the first polarizer 80 is provided, the backlight 300 may be under the first polarizer 80.

Referring to FIG. 8, since the second polarizer 82 and the window 190 are provided, the sensing electrodes 70 may be formed in between the second substrate 20 and the window 190. Therefore, as a detailed example, as shown in FIG. 8, the sensing electrodes 70 may be on the top of the second polarizer 82, the sensing electrode 70 may be on the bottom of the window 190. Alternatively, the sensing electrodes 70 may be on the top of the second substrate 20 or on the bottom of the second polarizer 82.

Further, a second passivation layer 84 may be under the color filter patterns 92.

Further to the above, exemplary embodiments relate to a display including liquid crystal display with an integrated touch screen panel, and to an integrated touch screen panel that may reduces and/or minimize resistance of a driving wire. For example, it is possible to provide a liquid crystal display integrated touch screen panel which minimizes resistance of driving wires by making the driving wires of metal.

By way of summation of review, types of driving methods for a liquid crystal display include, e.g., a twist nematic (TN) type, an in-plane switching (IPS) type, and a fringe field switching (FFS) type. The fringe field switching type may display an image by applying a fringe electric field to a liquid crystal display between opposite substrates. The fringe field switching type may provide a higher aperture ratio and transmittance than other types.

The liquid crystal display may include a touch screen function that allows inputting user's commands by selecting the instructions on the screen with fingers or objects, due to the requirement of users for convenient input. Touch screen panels are input devices that may allow for selection of contents displayed on the screen of an image display device, etc. using a person's hand or an object to input commands of a user.

The touch screen panels may be provided on a front face of the image display device and may convert positions where a person's hand or an object directly contacts into electrical signals. Accordingly, the instruction selected at the contact point is received as an input signal. The touch screen panels may be a substitute for separate input devices that are operated by being connected with the image display device such as a keyboard and a mouse. Thus, the use field of the touch screen panels is being expanded gradually.

Types of touch screen panels include, e.g., an ohmic layer type, a photosensitive type, and capacitive type. A capacitive type of touch screen panel may convert a contact position into an electrical signal by, e.g., a conductive sensing pattern that senses a change in electrostatic capacitance formed with another sensing pattern around or a grounding electrode, when a person's hand or an object contacts the panel.

A touch screen panel may be produced with a liquid crystal display on the outer side. However, when the touch screen panel is attached to the outer side of the liquid crystal display, an adhesive layer may be required between the touch screen panel and the liquid crystal display, such that the manufacturing time and cost may increase. Further, the entire thickness of the liquid crystal display increases due to the touch screen panel being attached to the outer side of the liquid crystal display.

Further to the exemplary embodiments discussed above, embodiments may be realized by providing a display device including a fringe field switching (FFS) type of a liquid crystal display with an integrated touch screen panel that uses the common electrode of the liquid crystal display as a driving electrode of a mutual capacitive touch screen panel. Embodiments may also be realized by providing a liquid crystal display integrated touch screen panel that reduces and/or minimizes resistance of a driving wire by making the driving wire of metal.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display integrated touch screen panel, comprising:
a first substrate having a plurality of gate wires and a plurality of data wires and having a plurality of pixels, each pixel including a thin film transistor and a pixel electrode, wherein the thin film transistor includes a first electrode connected to a data wire of the plurality of data wires, a gate electrode connected to a gate wire of the plurality of gate wires, and a second electrode connected to the pixel electrode;
a second substrate opposite to the first substrate;
an insulating layer on the pixel electrodes;
a plurality of transparent electrodes arranged in a first direction on the insulating layer;
a plurality of metal electrodes, each metal electrode including a coupling part attached to a side of a respective one of the transparent electrodes such that the coupling part and the respective one of the transparent electrodes define a single driving electrode, and each metal electrode including an extending part that extends beyond the respective one of the transparent electrodes to form a driving wire that receives a driving signal;
a plurality of sensing electrodes arranged in a second direction on the second substrate, the second direction intersecting the first direction; and
a liquid crystal layer between the first substrate and the second substrate, the liquid crystal layer being between the metal electrodes and the sensing electrodes and between the transparent electrodes and the sensing electrodes,
wherein the pixel electrodes, the transparent electrodes, the metal electrodes, the sensing electrodes and the liquid crystal layer are located with respect to each other such that liquid crystal molecules of the liquid crystal layer are rearrangeable by a voltage corresponding to a difference between a voltage applied to the pixel electrodes and a voltage applied to the transparent electrodes and the metal electrodes, and such that a touch contact with the liquid crystal display is recognizable by a change in mutual capacitance between the sensing electrodes and the transparent electrodes and the metal electrodes.

2. A liquid crystal display integrated touch screen panel comprising:
a first substrate having a plurality of gate wires and a plurality of data wires and having a plurality of pixels, each pixel including a thin film transistor and a pixel electrode;
a second substrate opposite to the first substrate;
an insulating layer on the pixel electrodes;
a plurality of transparent electrodes arranged in a first direction on the insulating layer;
a plurality of metal electrodes, each metal electrode including a coupling part attached to a side of a respective one of the transparent electrodes such that the coupling part and the respective one of the transparent electrodes define a single driving electrode, and each metal electrode including an extending part that extends beyond the respective one of the transparent electrodes to form a driving wire that receives a driving signal;
a plurality of sensing electrodes arranged in a second direction on the second substrate, the second direction intersecting the first direction; and
a liquid crystal layer between the first substrate and the second substrate, the liquid crystal layer being between the metal electrodes and the sensing electrodes and between the transparent electrodes and the sensing electrodes, and
wherein,
the coupling part has an opening, and the transparent electrodes have a plurality of slits,
the slits overlap the opening, and
the pixel electrodes, the transparent electrodes, the metal electrodes, the sensing electrodes and the liquid crystal layer are located with respect to each other such that liquid crystal molecules of the liquid crystal layer are rearrangeable by a voltage corresponding to a difference between a voltage applied to the pixel electrodes and a voltage applied to the transparent electrodes and the metal electrodes, and such that a touch contact with the liquid crystal display is recognizable by a change in mutual capacitance between the sensing electrodes and the transparent electrodes and the metal electrodes.

3. The liquid crystal display integrated touch screen panel according to claim 1, wherein the transparent electrodes are made of Indium Tin Oxide.

4. A liquid crystal display integrated touch screen panel, comprising:
a first substrate having a plurality of gate wires and a plurality of data wires and having a plurality of pixels, each pixel including a thin film transistor and a pixel electrode;
a second substrate opposite to the first substrate;
an insulating layer on the pixel electrodes;
a plurality of transparent electrodes arranged in a first direction on the insulating layer;
a plurality of metal electrodes, each metal electrode including a coupling part attached to a side of a respective one of the transparent electrodes such that the coupling part and the respective one of the transparent electrodes define a single driving electrode, and each metal electrode including an extending part that extends beyond the respective one of the transparent electrodes to form a driving wire that receives a driving signal;
a plurality of sensing electrodes arranged in a second direction on the second substrate, the second direction intersecting the first direction;
a liquid crystal layer between the first substrate and the second substrate; and
a driving electrode driving unit that sequentially supplies driving signals to driving wires of the metal electrodes, the liquid crystal layer being between the metal electrodes and the sensing electrodes and between the transparent electrodes and the sensing electrodes,
wherein the pixel electrodes, the transparent electrodes, the metal electrodes, the sensing electrodes and the liquid crystal layer are located with respect to each other such that liquid crystal molecules of the liquid crystal layer are rearrangeable by a voltage corresponding to a difference between a voltage applied to the pixel electrodes and a voltage applied to the transparent electrodes and the metal electrodes, and such that a touch contact with the liquid crystal display is recognizable by a change in mutual capacitance between the sensing electrodes and the transparent electrodes and the metal electrodes.

5. The liquid crystal display integrated touch screen panel according to claim 1, further comprising:

a first polarizer and a second polarizer attached to the outer sides of the first substrate and the second substrate, respectively; and a window attached to the outer side of the second polarizer.

6. The liquid crystal display integrated touch screen panel according to claim 5, wherein the sensing electrodes are between the second substrate and the window.

7. The liquid crystal display integrated touch screen panel according to claim 1, further comprising:

a black matrix under the first substrate; and color filter patterns.

8. The liquid crystal display integrated touch screen panel according to claim 1, further comprising a backlight under the first substrate, the backlight providing light for illuminating the liquid crystal display.

9. The liquid crystal display integrated touch screen panel according to claim 1, wherein the insulating layer includes a portion thereof between each pixel electrode and a corresponding transparent electrode.

10. The liquid crystal display integrated touch screen panel according to claim 1, wherein each coupling part is between the second substrate and a corresponding transparent electrode.

11. The liquid crystal display integrated touch screen panel according to claim 10, wherein each coupling part has a longitudinal direction that parallels a longitudinal direction of a corresponding transparent electrode, the coupling part and transparent electrode overlapping each other.

12. The liquid crystal display integrated touch screen panel according to claim 11, wherein each driving wire is connected to a corresponding coupling part, the driving wire having a longitudinal direction that parallels a longitudinal direction of the sensing electrodes.

13. The liquid crystal display integrated touch screen panel according to claim 1, wherein the coupling part is directly on a corresponding transparent electrode.

14. The liquid crystal display integrated touch screen panel according to claim 13, wherein the coupling part includes an edge portion defining an opening in the coupling part, the opening exposing a portion of the corresponding transparent electrode, the edge portion being continuous.

15. The liquid crystal display integrated touch screen panel according to claim 14, wherein the exposed portion of the corresponding transparent electrode includes a plurality of slits, a longitudinal direction of the slits being parallel to a longitudinal direction of the sensing electrodes.

16. The liquid crystal display integrated touch screen panel according to claim 1, wherein the second substrate is between the liquid crystal layer and the sensing electrodes.

17. The liquid crystal display integrated touch screen panel according to claim 1, wherein each metal electrode includes a coupling part directly stacked on and connected to a respective one of transparent electrodes, and the stacked coupling part and respective one of the transparent electrodes define the single driving electrode, the plurality of metal electrodes and the plurality of transparent electrode providing a plurality of single driving electrodes.

18. The liquid crystal display integrated touch screen panel according to claim 17, wherein the second substrate is between the single driving electrodes and the sensing electrodes.

* * * * *